June 23, 1953
T. J. SMULSKI
2,642,612
WINDSHIELD WIPER
Original Filed Jan. 5, 1946
2 Sheets-Sheet 1
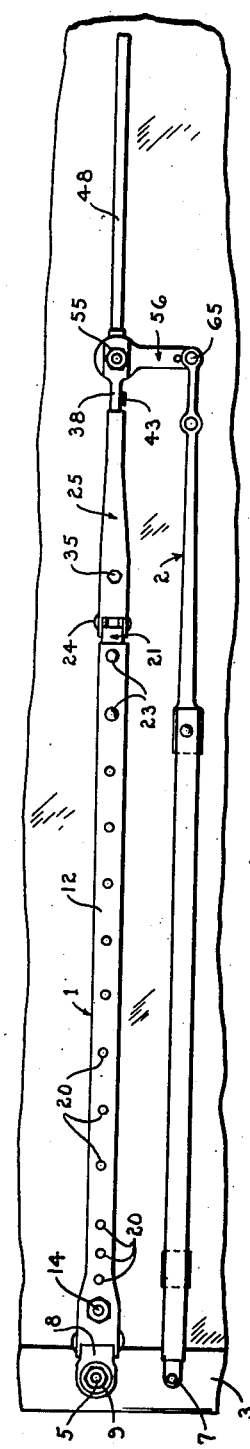
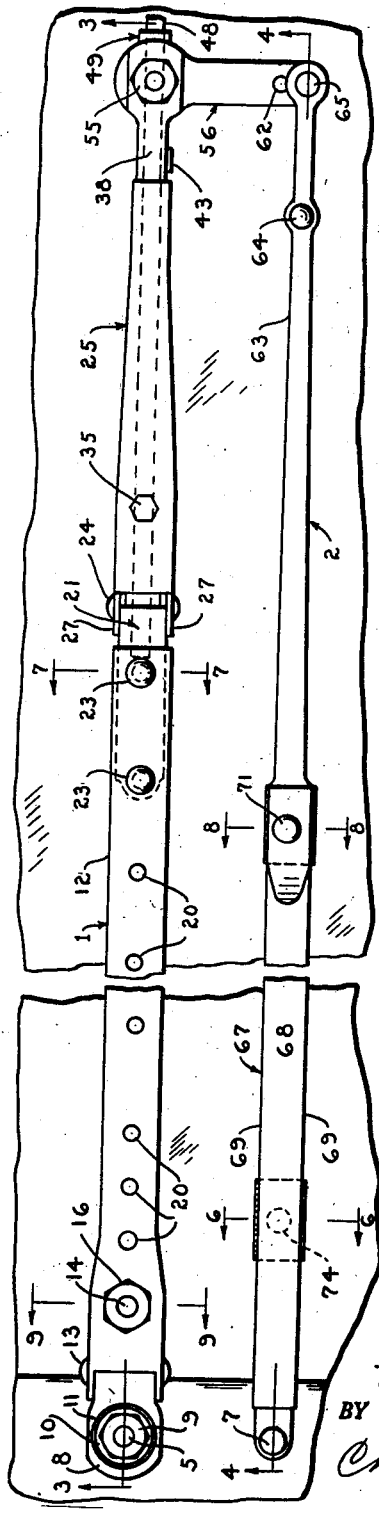
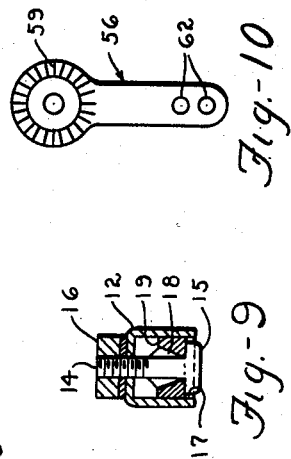
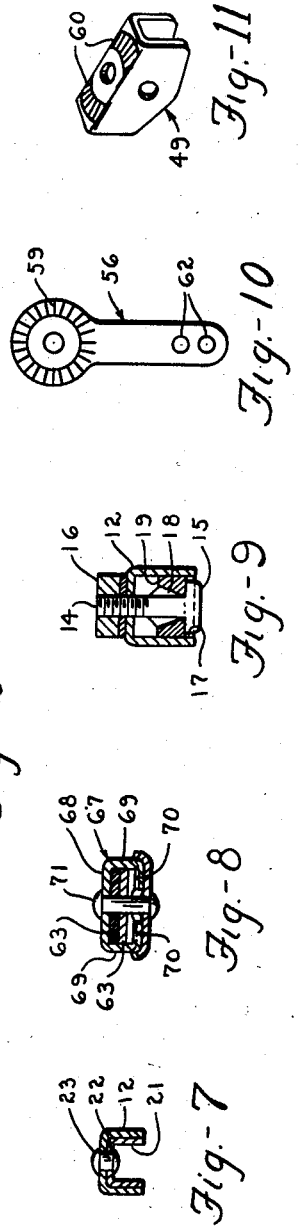
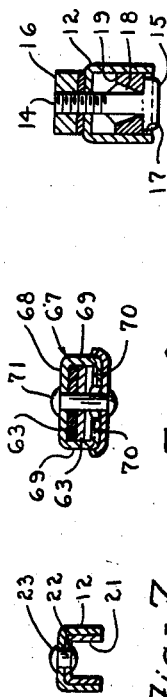
INVENTOR.
THEODORE J. SMULSKI
BY
Charles S. Penfold
ATTORNEY June 23, 1953 T. J. SMULSKI 2,642,612
WINDSHIELD WIPER
Original Filed Jan. 5, 1946 2 Sheets-Sheet 2
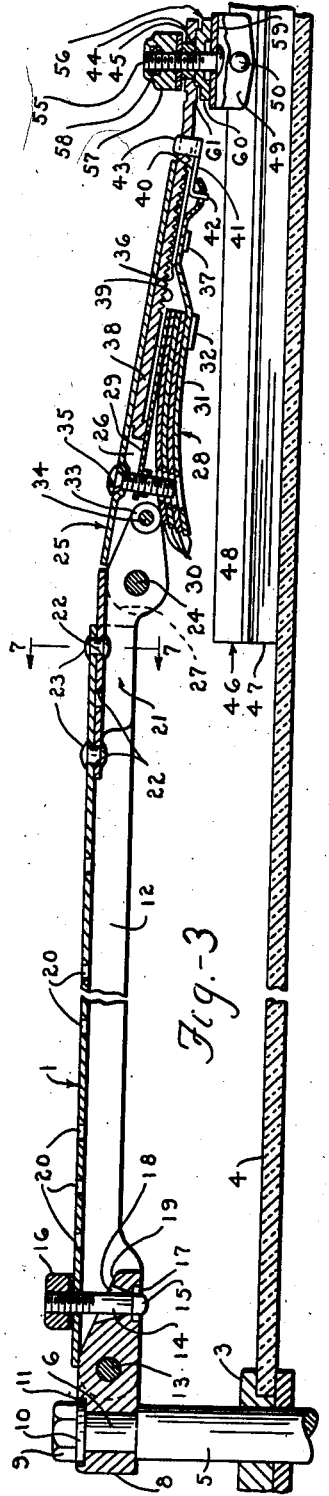
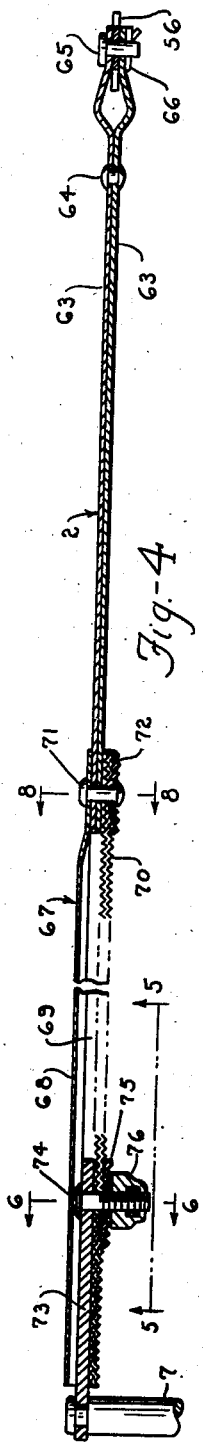
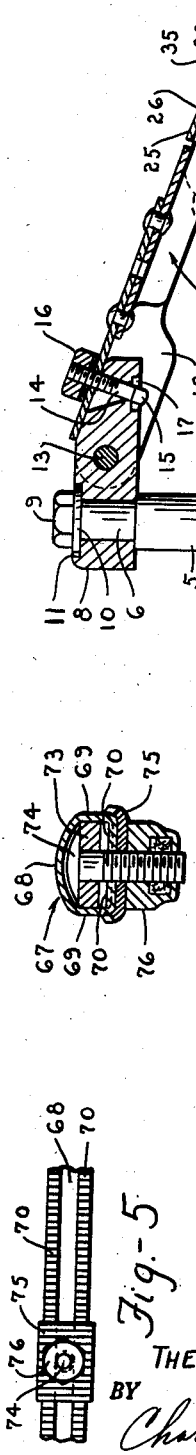
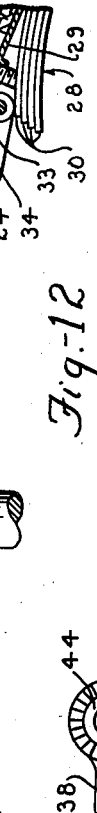
INVENTOR.
THEODORE J. SMULSKI
BY Charles S. Penfold
ATTORNEY Patented June 23, 1953

2,642,612

UNITED STATES PATENT OFFICE 2,642,612

WINDSHIELD WIPER

Theodore J. Smulski, Gary, Ind., assignor to Productive Inventions, Inc., a corporation of Indiana Original application January 5, 1946, Serial No. 639,384, now Patent No. 2,550,095, dated April 24, 1951. Divided and this application May 5, 1950, Serial No. 160,240

10 Claims. (Cl. 15—250)

This invention relates to windshield wipers, and particularly to the provision of a simple structure which may be modified in many ways to provide structures adapted for a multiplicity of specific installations.

Many of the needs sought to be met in this invention in a practical and economical manner arise in connection with military aircraft and military vehicles such as tanks, trucks and tractors. The reduction of military inventories for replacement purposes is an object of such outstanding importance that it can scarcely be exaggerated.

The primary object of the invention is to reduce inventory of alternative parts, units and arms, and to provide structures which may be adjusted and/or modified and/or combined with simple appurtenant parts to answer a wide variety of needs.

In airplane constructions need is encountered for wiper arms of unusual lengths of a great variety of lengths. The present invention is designed to meet that need without parts duplication.

There is need for structures in which the wiper blade does not turn with the wiper arm but maintains a fixed attitude at all times; also for structures in which the wiper blade is secured in fixed relation to the wiper arm and in any selected angular relation to the latter. The present invention is designed to meet all these requirements without duplication of parts.

There is need for structures in a great variety of lengths in which the wiper blade is free to turn relative to the wiper arm and is controlled in its angular movement by an oscillatory, movement modifying arm. The present invention provides for wide range and precise adjustment of length of the movement modifying arm as well as the wiper arm.

There is need for wiper arms of various lengths designed to wipe conical as well as flat surfaces. The present invention provides a structure which can be readily adapted to act upon surfaces which are either flat, convex or concave, and which has a wide capacity for adaption or adjustment as to length.

Other objects and advantages will hereinafter appear.

In the drawing forming part of this specification

Figure 1 is a fragmentary view of front elevation, illustrating a combination of wiper arm and movement modifying arm embodying features of the invention;

Figure 2 is a view similar to Figure 1, but upon a larger scale than Figure 1, which shows parts of the structure broken away intermediate their ends for compactness of illustration;

Figure 3 is a sectional view taken upon the line 3—3 of Figure 2, looking in the direction of the arrows;

Figure 4 is a sectional view taken upon the line 4—4 of Figure 2, looking in the direction of the arrows;

Figure 5 is a fragmentary view in rear elevation of a portion of the structure illustrated in Figure 4, as indicated by the line 5—5 of Figure 4 and the associated arrows;

Figure 6 is a sectional view taken upon the line 6—6 of Figure 4 looking in the direction of the arrows;

Figure 7 is a sectional view taken upon the line 7—7 of Figures 2 and 3, looking in the direction of the arrows;

Figure 8 is a sectional view taken upon the lines 8—8 of Figures 2 and 4, looking in the direction of the arrows;

Figure 9 is a sectional view taken upon the lines 9—9 of Figure 2 looking in the direction of the arrows;

Figure 10 is a rear view of an arm employed for connecting the wiper blade to the movement modifying arm;

Figure 11 is a perspective view of a wiper blade holding clip;

Figure 12 is a fragmentary, sectional view, showing the wiper arm of Figure 3 shortened and adjusted for acting upon a conical surface;

Figure 13 is a pictorial view of a section of the assembly; and

Figure 14 is partial bottom view of the free end of an arm section.

This application is a division by a co-pending application entitled Windshield Wiper, Serial Number 639,384, filed January 5, 1946 now Patent No. 2,550,095.

In Figures 1 to 4 disclosure is made of a combined wiper and movement modifying arm in which is included all of the structure necessary for meeting the various services referred to in the introductory portion of this specification.

The illustrative wiper arm 1, and the movement modifying arm 2 are shown as mounted upon a frame or body member 3 adjacent the windshield glass 4. A wiper motor shaft 5 extends forwardly through the frame structure 3 and has the wiper arm 1 made fast upon its reduced forward end 6. A bearing pin 7 is mounted upon the frame structure 3 to extend forward in parallelism with the shaft 5, and alongside the shaft. The pin 7 provides a bearing for the inner end of the modifying arm 2.

The wiper and modifying arms illustrated in Figures 1 to 4 are of exceptional length, being provided with extension members which may be cut away by selected amounts for bringing about lengthwise adjustment of the arm.

The wiper arm 1 comprises an inner supporting section 8 which is secured upon the reduced shaft portion 6 by means of a nut 9 and a washer 10, the nut 9 being threaded upon a reduced end portion of the shaft, and the washer 10 being adapted to bear in a recess 11 formed at the forward side of the wiper arm section 8. The section 8 has an extension channel 12 pivotally secured upon it by means of a pivot pin 13.

A T-bolt 14, having a narrow, elongated head 15, is passed through the outer end of the supporting section 8 of the arm and through the inner end of the extension channel 12, and has threaded upon its protruding forward end a nut 16 for bearing against the forward face of the extension channel 12. The head 15 of the bolt 14 is received in a recess 17 which is formed in the rear face of the supporting section 8. The shank of the bolt 14 extends through a flaring opening 18 which is formed in the forward wall of the supporting section 8.

As will be seen, the bolt 14 is free to rock as the nut 16 is adjusted to change the attitude of the extension channel 12 so that the nut 16 may at all times bear fully against the forward face of the extension channel 12. The supporting section 8 has the forward portion of its outer end cut away to provide a sloping forward face 19 for limiting adjustment of the extension channel 12.

The purpose of the adjustment described is to enable the wiper arm to be adjusted for wiping conical as well as flat surfaces. This will be explained more fully after the entire structure has been described.

The extension channel 12 has formed in its forward wall a series of openings 20. As illustrated, the inner three of these openings are disposed at one-half inch intervals, while the several additional ones are disposed at one-inch intervals.

The second or extension section, which comprises the extension channel 12, also includes a cooperating channel member 21. The channel member 21 includes a forward body portion and opposed side walls and is adapted to fit snugly within the extension channel 12. The forward wall of the channel member 21 is provided with three openings 22 which are spaced at one-half inch intervals. As shown best in Figure 3, two of the openings 22 are aligned with two of the openings 20 and rivets 23 are passed through the aligned openings and upset to secure the channel members 12 and 21 rigidly to one another.

When it is desired to reduce the length of the extension section, the rivets 23 may be cut off or drilled out, and the extension channel 12 cut off to the new desired length. Two of the openings 22 are then aligned with the two outermost openings which remain on the extension channel 12, and new rivets are inserted and applied. The extension section can be reduced in length by one-inch steps down to the point where the three openings 22 coincide with the three innermost openings 20. After that a further reduction in length of one-half inch may be secured by cutting off the portion of the extension channel 12 which contains the third opening 20, and cutting off the portion of the channel member 21 which contains the innermost opening 22. The desired final reduction of length is then secured by aligning the two remaining openings 22 with the two remaining openings 20 and applying fresh rivets.

For facilitating severance the channel members 12 and 21 are desirably made of mild steel or other comparatively soft metal which, though stiff enough to operate in the desired manner, is soft enough to admit of ready severance.

The channel member 21 carries a crosspin 24 upon which a third wiper arm section 25 is pivotally supported. The section 25 is itself well adapted to be a standard wiper arm section for universal service. It embodies the features of construction of U. S. Letters Patent 2,326,402 granted to me on August 10, 1943, and features disclosed and claimed in my pending application Serial No. 521,903, filed February 11, 1944, for Adjustable Length Windshield Wiper Arms. The wiper arm section, however, also includes novel structure at the outer end thereof as will be pointed out.

The wiper arm section 25 comprises a channel member 26 having ears 27 which embrace the channel walls of the member 21. It is through these ears 27 that the pivot pin 24 is passed for pivotally supporting the channel section 25.

Partially within the channel of the member 26 there is located a spring assembly 28 comprising a rigid plate 29 and a series of flexible leaf springs 30 and a further flexible leaf spring 31. The plate 29 is provided with fingers 32 which are wrapped around the collection of spring leaves to hold the parts in assembled relation. The spring leaves and the plate 29 are formed with interfitting formations to prevent relative longitudinal movement of the individual parts. The normal tendency of the spring leaves is to lie against the plate 29. The forward leaf 30 bears against a roller 33 which is mounted upon a pin 34, the latter being carried by the channel member 21 at the outer end thereof. A screw 35 is passed through the forward wall of the channel member 26 and threaded through the inner end of the plate 29. By turning the screw, the inner end of the plate 29 may be forced forward toward the forward wall of the channel member 26, and since the inner ends of the leaves 30 cannot follow because of the obstruction interposed by the roller 33, the leaf springs are stressed and tend to rock the wiper arm section 25 rearwardly toward the windshield about the axis of pivot pin 24.

The outer end of the spring 31 extends over a spring plate 36, portions of which rest upon the side walls of channel member 26. Fingers 37 formed on said side walls are folded around to embrace a portion of the spring 31, and serve both to hold the spring 31 against longitudinal shifting and to hold it in assembled relation with the inner end of the plate 36 and with the channel member 26.

Between the spring plate 36 and the forward wall of the channel member 26 there is provided a slidable wiper arm section 38. The member 38 is provided in its rear face with a series of alternate teeth and notches, the teeth being designated 39. These notches are provided at frequent intervals, and most desirably at intervals which constitute an aliquot part of one-half inch for a reason that will be made clear farther on.

The notches are adapted to be engaged by a nose portion 40 at the outer end of the spring plate 36. The nose portion 40 has to be forced into a notch, however, the tendency of the spring plate 36 being to hold the nose clear of the teeth 39.

A locking lever 41 is provided with a finger 42 through which it is pivoted in an offset end portion of the spring 31. The lever is adapted to be operated by a finger piece 43 between the spring plate 36 and the outer extremity of the spring 31.

When the lever 41 is in the longitudinally extending position illustrated in Figure 3, it is pressed firmly against the outer end of the spring plate 36 and is thereby caused to force the nose portion of the plate 36 into one of the notches of the member 38. With the parts in this condition, the member 38 is securely locked against longitudinal movement.

When it is desired to adjust the lengthwise position of the member 38, the lever 41 is operated to a transverse position in which it extends freely between the spring plate 36 and the offset portion of the spring 31 in which it is pivoted. The nose 40 now springs clear of the teeth 39 so that the member 38 can be freely adjusted.

The structural features of the arm section 25 which have been thus far described are clearly disclosed and are claimed in the patent and application above referred to.

The teeth 39 cover a range of adjustment of more than one inch. The adjustments provided by the extension section and by the teeth 39 provide, therefore, for adjustment to any desired length within a tooth space throughout the total range of adjustment which is made available.

The outer end of the member 38 is generally flat, but is formed with a circular raised area 44 at its forward side and a corresponding circular depressed area at its rearward side. The spacer bushing 45 extends through the center of this region of displacement.

A wiper blade 46 is provided comprising a flexible wiping element 47 and a rigid, channeled, metallic blade frame 48. The blade frame 48 is embraced by a U-shaped clip 49, and is rockingly supported from the clip by a rivet 50 which is passed through the clip walls, the blade frame 48, and the wiping element 47. A headed bolt 55 extends through the forward wall of the clip 49, through the inner end of a link 56, and through the bushing 45, being held in assembled relation with the link and the bushing by an elastic stop nut 57.

The stop nut 57 is of well-known construction, comprising a metallic body formed with an annular recess, which has a fibre washer 58 trapped in it.

The pressure of the nut 57 is transmitted through the bushing 45 and the link 56 to the clip 49. Since the bushing 45 is of greater thickness than the metal of the arm member 38 through which it passes, no pressure is applied to the member 38, and the wiper blade assembly described, together with its mounting means, is free to turn about the axis of the bolt 55 in relation to the arm member 38. The rear face of the link 56 is formed with an annular knurled or serrated area 59 while the forward face of the clip 49 is formed with segmental knurled or serrated areas 60 for engaging the area 59. With this construction the link 56 is adapted to be locked in any desired angular relation to the clip 49, the link being utilized for controlling angular motion of the clip and the wiper blade 46 through the influence of the movement modifying arm 2.

It is not necessary, however, that the link 56 be included or that the movement modifying feature be employed. When it is desired to discard these features, the nut 57 is simply unscrewed from the bolt, the link 56 is removed, and the nut and bolt are reassembled at opposite sides of the member 38 and of the bushing 45.

It will be noticed that the clip 49 is long enough to engage an annular shoulder area or boss 61 which surrounds the depressed area in the rear face of the member 38. The forward face of the clip 49 has a plane surface so that no portion of the clip enters the recess in the rear face of arm section 38. While the bushing 45 is thicker than the metal of the member 38 through which it passes and, therefore, served when the link or arm was employed to prevent the application of pressure to the member 38, the bushing is not thick enough when the link 56 has been removed to prevent the clamping of the member 38 between the clip 49 and the lock nut 57. The shoulder area 61 may desirably be knurled or toothed as illustrated in Figure 14 for cooperating with the toothed areas 60 of the clip 49 so that the clip may be firmly clamped in any adjusted rotative position to the arm member 38. The knurled or teeth on the boss portion 61 is ineffective when the lever 56 is present because the opposed surface of the lever 56 is spaced from the boss 61.

Referring now to the structure as shown in Figures 1 to 4 in which the lever 56 is employed, it will be observed that the lever 56, which is made to turn in unison with the clip 49, is provided at its free end with one or more holes 62 which may be selectively utilized for pivotally connecting the lever to the movement modifying arm 2 whereby to obtain a particular movement of the blade or when the distance between the pivots 5 and 7 is varied.

The modifying arm comprises at its outer end a pair of plates 63 which are held together by a rivet 64 and whose outer ends are spaced apart to receive the lever 56 between them. A pin 65 is passed through the ends of the plates 63 and through the lever 56 and is held in place by a cotter pin 66.

The plates 63 are received at their inner ends within a reduced end portion of a channel member 67. The channel member 67 comprises a front wall 68, side walls 69 and rear walls or flanges 70, the last named being turned inward in a common plane toward one another but with a space intervening continuously between them. The inturned walls 70 are serrated, the deformations being pressed right through the metal so that the serrations appear both upon the inner and outer faces of the walls 70. A rivet 71 is passed through the wall 68, through the plates 63, between the walls 70 and through a serrated washer 72, being upset to unite the parts firmly with one another. The teeth and notches of the walls 70 are aligned with one another, and each tooth space is desirably made equal in length to a tooth space of the member 38.

The inner end of the channeled member 67 receives an arm 73 which is affixed to the pivot pin 7. The arm 73 is desirably made wide enough throughout its length to fill the space between the side walls 69 of the channel member 67. A bolt 74 whose head has flat, parallel side faces and fills the space between the side walls 69 of member 67, is passed through the plate 73, between the walls 70, and through a serrated washer 75. An elastic stop nut 76 is threaded onto the bolt 74 for securing the channel member 67 in fixed relation to the arm 73.

When the described structure is employed as a parallel motion linkage the space between the axes of the wiper motor shaft 5 and the pivot pin 7 is equal to the effective length of the lever arm 56. The effective length of the wiper arm from the axis of shaft 5 to the axis of bolt 55 is equal to the effective length of the movement modifying arm from the axis of pivot pin 7 to the axis of pin 65. The wiper arm 1 and the movement modifying arm 2 consequently maintain a parallel relation throughout their operations, while the lever arm 56 maintains a parallel relation to the line joining the axes of the shaft 5 and the pivot pin 7 at all times. Since the wiper blade 46 is secured in fixed relation to the lever arm 56, the angular disposition of the blade 46 does not change in operation.

The blade may, for example, be set in a vertical attitude and will retain a vertical attitude as it sweeps from side to side of the windshield. As illustrated, the axes of shaft 5 and pivot pin 7 lie in a common horizontal plane so that the vertically disposed wiper blade 46 would extend at right angles to that horizontal plane. Should it be desired to dispose the wiper blade at any other angle to the plane in which the axes of the shaft 5 and pivot pin 7 lie, this may be brought about by loosening the stop nut 57, adjusting the clip 49 relative to the arm 56, and tightening the stop nut 57 again.

When the lengths of the wiper and the movement modifying arms as disclosed are greater than required for a particular installation, the wiper arm may be shortened, as already explained, and the movement modifying arm may be shortened by cutting away a portion of the channel member 67 adjacent its left extremity. This last operation is effected by partially backing off the stop nut 76, withdrawing the channel member 67 from the arm 73, cutting off any desired length of the channel member and reapplying the remainder in the manner illustrated in Figure 4. The effective shortening of the channel member 67 is necessarily a whole number of tooth spaces for the reason that the position of the nut 75 longitudinally of the arm 73 is fixed. While the channel member 12 of the extension section of the wiper arm can only be reduced by multiples of one inch plus a final one-half inch, if desired, it will be remembered that the arm section 38 can be adjusted by tooth space intervals throughout the range of more than one inch. It is possible, therefore, through effecting combined adjustments of the wiper arm, to bring about any effective length throughout the entire range of available adjustment at tooth space intervals. The wiper arm and the movement modifying arm may accordingly be adjusted in unison throughout the entire available range, the available lengths differing from one another by a single tooth space.

The channel member 67 is desirably made of mild steel or other comparatively soft metal to facilitate severance, the material being sufficiently stiff, however, to serve the desired purpose.

While the comprehensive structure including the movement modifying arm and the lever arm 56 has been illustrated, it is to be understood that these parts will be omitted in many installations.

When it is desired, for example, to apply the wiper and wiper arm to the wiping of a spherical or flat surface, as is frequently required in aircraft, the lever 56 and the modifying arm 2 would not be employed. The arm may, of course, be used full length as shown in Figures 1 to 3, but with the lever 56 and the modifying arm 2 omitted, or it may be adjusted to any desired length according to the requirements of a particular installation.

In Figure 12 the arm is shown cut down to nearly the shortest possible length and adjusted to form the smallest apex angle within the available range of adjustment. As illustrated, the channel member 12 forms an angle of 70° with the axis of shaft 5. This adjustment would desirably be employed when one-half the apex angle of the conical surface of the windshield is 70°, since it is desirable that the axis of shaft 5 coincide with the attitude of the cone and that the channel member 12 extends parallel to the conical surface in order to avoid variations of spring pressure as the wiper travels from side to side upon such surface.

Should one-half the apex angle be greater than 70°, the nut 16 would simply be backed off from the position illustrated in Figure 12 far enough to permit the channel member 12 to form with the axis of shaft 5 an angle which is equal to one-half of the apex angle. In other words, the angle formed by the shaft and the arm and the position of the shaft as described are only applicable to certain installations. When the shaft is installed at a predetermined angle with respect to the glass, the outer end of the arm and the wiper blade secured thereto will be caused to follow the same radius of the curvature or condition of the glass. The adjustment described provides means whereby the attitude of the arm and blade may be changed as desired, to meet variable conditions. In other words, the angle of the arm may be adjusted to any one of a plurality of angular positions and held in such position whereby the wiper blade may be brought to the appropriate position to wipe the particular surface to be cleaned.

The spring assembly 28 above referred to causes the channel member 12 to follow the nut 16 as the nut is backed off, the tendency of the spring being to swing the channel member 12 counter-clockwise upon the pin 13, and the wiper section 25 clockwise about the pin 24. Backing off of the nut 16 would permit a change of attitude of the section 12 relative to the section 25 and a relaxation of the spring pressure. The desired spring pressure may be restored by adjustment of the screw 35.

I have described what I believe to be the best embodiments of my invention. I do not wish, however, to be confined to the embodiments shown, but what I desire to cover by Letters Patent is set forth in the appended claims.

I claim:

1. A supporting arm provided with detent means, attaching means to which cleaner means may be attached, said attaching means being provided with positioning means, a link interposed between said attaching means and said arm, said link being provided with detent means, means passing through said arm, said attaching means and said link and constructed and arranged in a manner whereby the detent means on said link may be caused to engage said positioning means on said attaching means to permit the link and attaching means to freely pivot with respect to said arm and when said link is removed, the positioning means on said attaching means may be caused to engage the detent means on said arm to hold said attaching means against pivotal movement with respect to said arm.

2. A windshield wiper comprising, in combination, a wiper blade carrying section, a blade clip, a movement modifying link interposed between the clip and the arm section, a bolt passed through the clip, the link, and the arm section, a spacing and bearing bushing impaled upon the bolt and received in the arm section, and a nut threaded on the bolt, said arm section being formed with a recess in its rear face in the area surrounding the bolt, and said link being formed with a boss adapted to enter the recess and to engage the spacer bushing therein, the spacer bushing having a thickness greater than the thickness of the arm section metal in the area adjacent the bolt opening, but greater than the sum of such arm metal thickness and the depth of the recess, the construction and arrangement being such that the clamping pressure of the nut is applied through the spacer bushing and link directly to the blade clip independently of the arm section when the link is present, but will be applied through the arm section to the clip independently of the spacer bushing when the link is removed.

3. A windshield wiper as set forth in claim 2 in which the forward face of the blade clip is provided with knurled areas adapted for alternative engagement with the link and with the arm section to assist in holding the blade in any selected angular relation to the link when the link is present, and in any selected angular relation to the arm section when the link is not present.

4. A windshield wiper arm provided with an opening, a wiper blade, a fitting carried by the blade, a link interposed between the arm and the fitting, said fitting and link being provided with serrations, a threaded element extending through at least a part of the fitting, through the link and through the opening in the arm, and a nut carried by the element, the arrangement being such that the link and fitting may be rotatively adjusted with respect to one another and then locked in place after adjustment and when locked may pivot with respect to the arm.

5. A windshield wiper arm provided with an opening, a fitting for supporting a wiper blade, a link interposed between the arm and the fitting, said fitting and link being provided with serrations, a threaded element extending through the arm, fitting and link, a nut carried by the element, the arrangement being such that the link and fitting may be rotatably adjusted with respect to one another and then locked in place after adjustment and when locked may pivot with respect to the arm.

6. A windshield wiper arm provided with an opening, a fitting for supporting a wiper blade, a link interposed between the arm and the fitting, said fitting and link being provided with serrations, a threaded element extending through the arm, fitting and link, a nut carried by the element, the arrangement being such that the link and fitting may be rotatably adjusted with respect to one another and then locked in place after adjustment to permit the fitting and link as a unit to freely rotate with respect to the arm.

7. A windshield wiper arm member provided with an opening, a serrated portion concentrically arranged with respect to the opening, a blade supporting member provided with a wall having an opening and a serrated portion, an elongated link having an inner extremity provided with an opening and having a serrated portion, the outer extremity of the link being provided with means whereby the link may be connected to an arm for modifying the movement of the wiper arm, a threaded element extending through all of the openings, and a nut carried by the threaded element, the arrangement being such that the blade supporting member and link may be adjusted to a selected position whereupon the nut can be manipulated so that the serrated portions on the blade supporting member and link will be caused to intimately engage one another to lock such member and link together as a unit and permit such unit to freely rotate relative to the arm, and affording a re-arrangement whereby the link may be removed in order that the element, serrated portion on the blade supporting member and the serrated portion on the arm will permit relative rotative adjustment and then intimate engagement of said portions to prevent relative rotational movement therebetween.

8. A windshield wiper arm provided with an opening, a wiper blade, a fitting carried by the blade, a link interposed between the arm and fitting and provided with an opening, a threaded element extending through the openings in the arm and line, a nut carried by the element for holding the link connected to the arm, and means located on opposite sides of the element for locking the link and fitting against relative movement, the arrangement being such that the blade, fitting, element and link may swing as a unit relative to the arm.

9. A windshield wiper arm part having an opening therein, a wiper blade, a fitting connected to the blade having a base wall provided with an opening, an elongated member extending through the openings, said member having abutment means at its inner end bearing against the inner surface of the base wall of the fitting and an exposed threaded outer end, a nut carried by the threaded end, and said arm part and said base wall each being provided with toothed means cooperable with one another to prevent relative rotation between the fitting and part when the nut is tightened.

10. A windshield wiper arm part having an opening therein, a fitting adapted to be connected to a wiper blade, said fitting having a base wall provided with an opening, an elongated member extending through the openings, said member having abutment means at its inner end bearing against the inner surface of the base wall of the fitting and an exposed threaded outer end, a nut carried by the threaded end, and said arm part and said base wall each being provided with toothed means cooperable with one another to prevent relative rotation between the fitting and arm part when the nut is tightened.

THEODORE J. SMULSKI.

References Cited in the file of this patent

UNITED STATES PATENTS

| Number | Name | Date |
| --- | --- | --- |
| 1,253,377 | Hicks et al. | Jan. 15, 1918 |
| 1,318,839 | Breese | Oct. 14, 1919 |
| 1,571,516 | Folberth et al. | Feb. 2, 1926 |
| 1,576,381 | Van Derbeck | Mar. 9, 1926 |
| 1,703,181 | Tarver | Feb. 26, 1929 |
| 2,376,012 | Sacchini | May 15, 1945 |